Sept. 20, 1932.    W. O. SNELLING    1,878,007

PROCESS OF DISTILLATION

Filed Sept. 28, 1928

Inventor:
Walter O. Snelling.

Patented Sept. 20, 1932

1,878,007

UNITED STATES PATENT OFFICE

WALTER O. SNELLING, OF ALLENTOWN, PENNSYLVANIA

PROCESS OF DISTILLATION

Application filed September 28, 1928. Serial No. 309,090.

My invention relates to improvements in distillation, and more particularly relates to improved methods for the distillation of volatile liquids for the purpose of obtaining highly refined products therefrom. The principal object of my invention is to provide means for obtaining liquid products of distillation of great purity.

I have discovered that when a volatile liquid is distilled in the presence of a liquid immiscible with both the liquid and the gaseous phases of the liquid being distilled, and preferably in the absence of any vapor other than the vapor of the liquid being distilled, the product obtained as a result of such distillation possesses unique and valuable characteristics.

Carbon disulfide, for example, when distilled in accordance with my present invention, possesses a sweet, ethereal odor, in marked distinction to the odor of the product as purified by ordinary distillation, and in general liquids which are readily susceptible to chemical change during distillation, and particularly liquids which tend to undergo chemical change when slightly overheated or when brought into contact with other vapors while in vaporous condition, may be obtained by my process in a form of higher purity than is possible by methods at present known.

Figure 1:
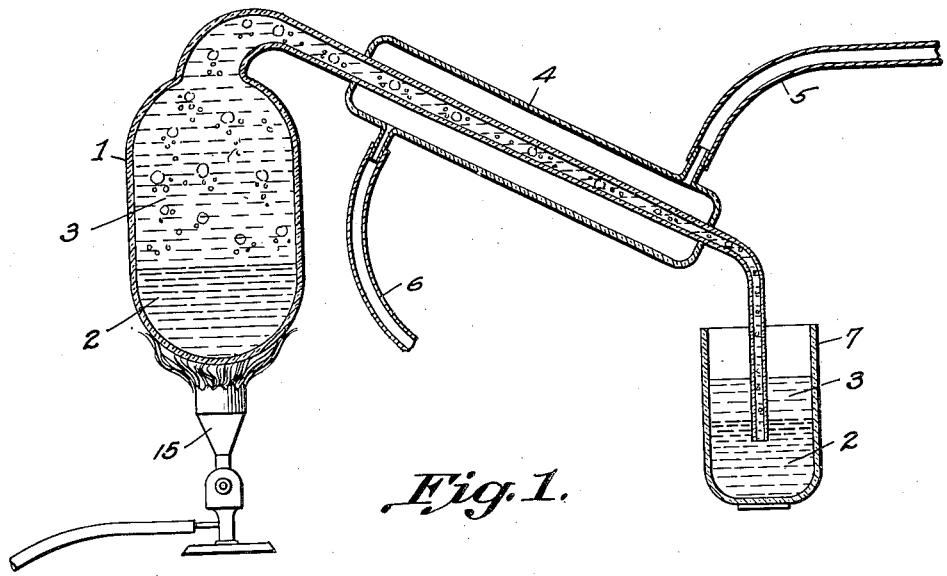
Figure 2:
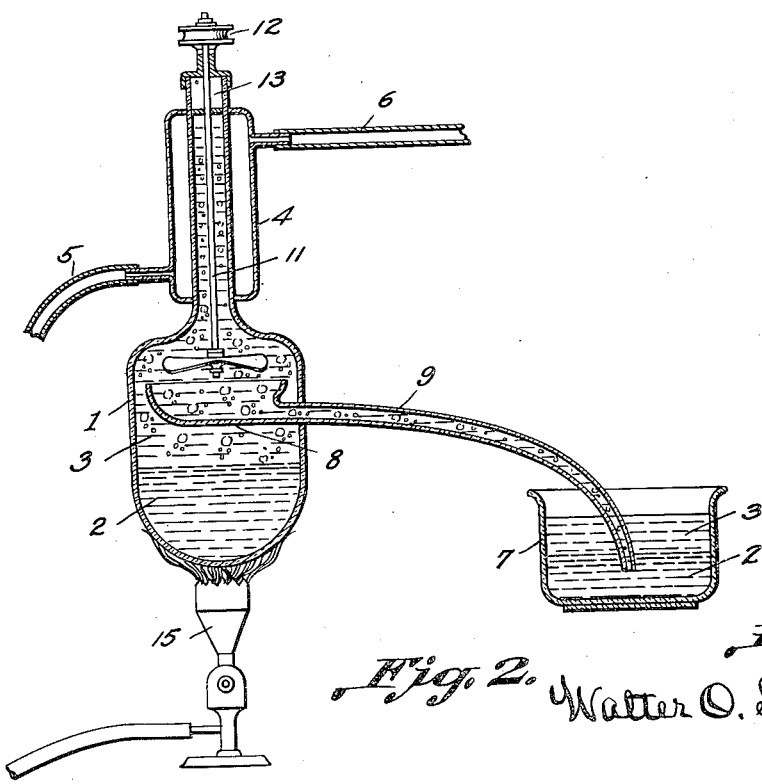

In the drawing which forms a part of this specification, Figure 1 shows diagrammatically a section through a very simple form of apparatus that may be used in the practice of my present invention. Figure 2 shows diagrammatically a section through a modified form of apparatus which may also be used in the distillation of volatile liquids in accordance with my present invention.

In Figure 1, 1 is a retort containing a liquid 2 and a second, lighter, immiscible liquid 3. 4 is a condenser provided with an inlet 5, for introducing a cooling fluid and with an outlet 6, for the exit of the cooling fluid. 7 is a receiving vessel, and normally containing a lower layer of liquid 2 and an upper layer of a lighter immiscible liquid 3. 15 represents diagrammatically a Bunsen burner or any other suitable source of heat.

In Figure 2, 1 is a retort containing a liquid 2 and a second lighter immiscible liquid 3. 4 is a condenser provided with an inlet 5 for the introduction of a cooling fluid and with an outlet 6, for the exit of spent cooling fluid. 7 is a receiving vessel and normally contains a lower layer of liquid 2 and an upper layer of a lighter immiscible liquid 3. 8 is a funnel-shaped or cup-shaped enlargement of tube 9, tube 9 forming a communicating means between the still 1 and the receiving vessel 7. 10 is a stirrer, connected to a rod 11 and driven by a pulley 12, the pulley 12 being turned by any suitable prime mover. 13 is a stuffing box, to prevent any contact of the atmosphere surrounding the still with the contents of the still. 15 represents diagrammatically a Bunsen burner or some other suitable source of heat.

In the practice of my invention, I may conveniently use apparatus of the general form shown in Figure 1, in which carbon bisulfide may be considered as the liquid 2 and water may be considered as the liquid 3. The desired quantity of carbon bisulfide is first introduced into the retort 1, and after such desired quantity of carbon bisulfide has been introduced, the retort, including its extension through the condenser tube, and the receiving vessel 7, are filled with a second liquid lighter than carbon bisulfide and immiscible therewith. This liquid 3, may conveniently be water, and it should be noted that no space not occupied by the liquid to be distilled or by the second liquid should be left within the distillation apparatus, although suitable means for expansion should be provided at some point, as through the open vessel 7.

Upon heating the carbon bisulfide in retort 1 its temperature will gradually increase until its boiling point, under the condition of pressure existing in the apparatus, has been reached. Transfer of heat from the carbon bisulfide to the overlying water will of course occur, but as the boiling point of water is higher than the boiling point of carbon bisulfide, the water will remain liquid at the temperature at which the carbon bisulfide begins to boil.

When both the water and the carbon bisulfide have reached the boiling temperature of the carbon bisulfide, distillation of the carbon bisulfide will begin, and will continue without any contact of the carbon bisulfide vapor with any other vapor. The volume of distilled carbon bisulfide in receiving vessel 7 will be found to continuously increase, in proportion as the volume of carbon bisulfide in the distilling vessel 1 decreases, and I prefer to thus distill until approximately three fourths of the charge of carbon bisulfide introduced into the distillation vessel has been transferred by distillation to the receiving vessel.

The carbon bisulfide which is distilled by the present process will be found to be entirely unlike ordinary carbon bisulfide in odor, and instead of possessing the usual characteristic and quite offensive odor of carbon bisulfide, will be observed to possess a mild, sweet and somewhat ethereal odor, quite pleasant in its nature.

The operation of the apparatus shown in Figure 2 is in general similar to the apparatus shown in Figure 1, and corresponding parts have been similarly numbered. The principal difference between the apparatus shown in Figure 1 and that shown in Figure 2 is the provision, in the apparatus shown in Figure 2, of means for stirring the liquid overlying the liquid being distilled.

It will be noted that the principal feature of novelty of my present invention is the distillation of a liquid in contact with a second lighter immiscible liquid occupying all of the space in the distillation vessel not occupied by the material being distilled. Under these circumstances there is no opportunity for the vapor of the liquid being distilled to become admixed with another vapor, and many chemical agents are particularly susceptible to molecular changes such as condensation and molecular rearrangement when in vaporous condition at the temperature normally used in distillation. Even minute amounts of other vapors tend to act as catalysts with the production of molecular changes of unknown nature. By my invention volatile liquids may be vaporized, fractionated and condensed under conditions which preclude the admixture of any foreign vapor with the vapor of the liquid undergoing distillation, during the entire period that it is in vaporous condition.

Although I have specifically referred to the distillation of carbon bisulfide, it will of course be understood that my invention is broadly applicable to the treatment of a great number of chemical bodies. I have employed my present invention successfully in the distillation of chloroform and carbon tetrachloride, for example, employing water as the overlying liquid, and have thus obtained distilled fractions of very high purity. In applying my present invention to the treatment of other bodies than those described in the present examples, it is desirable to select pairs of immiscible liquids having boiling points relatively far apart, and which are reasonably different in specific gravity. Information covering the boiling points and specific gravities of practically all known liquids can be found in published tables of critical constants. It is desirable, from a standpoint of simplicity, that the lower boiling liquids should be heavier than the liquid of higher boiling point, since under these conditions the two liquids occupy the same relative positions in the distillation flasks that the liquid and the vapor occupy in ordinary distillation and special means do not have to be taken to bring about the desired contact of the vapor of the light liquid with the second liquid present.

Although I prefer to employ atmospheric pressure in the practice of the present invention, it will be evident that either sub-atmospheric or super-atmospheric pressures may be employed, where pressures other than normal atmospheric pressure can be employed to advantage. The necessary modifications of the distillation vessel for the use of either sub-atmospheric or super-atmospheric pressure are well known to those versed in the art, and the use of pressures other than normal atmospheric pressure does not modify in any way the principles underlying the present invention.

Although I prefer to employ water or other neutral and inactive liquid as the higher boiling liquid used in the present process, it will be evident that at times the use of an active liquid may be preferable, and in the distillation of readily oxidizable or readily reducible liquids I may employ aqueous solutions of reducing agents or oxidizing agents as my overlying liquid. By using dilute nitric acid instead of water for example, in the distillation of organic liquids subject to ready reduction, or by using a dilute aqueous solution of true sodium hyposulfite (commonly but incorrectly known as sodium hydrosulfite) in the distillation of organic liquids subject to ready oxidation, or by the use of a dilute solution of sodium hydroxide in the distillation of liquids subject to acid hydrolysis, or by the use of a dilute solution of sulfuric acid in the distillation of liquids subject to alkaline hydrolysis, the presence of minute amounts of oxidation, reduction or hydrolytic products in the distillate may be avoided, and in general I can combine my distillation step with a purifying step, by the use of an active light liquid overlying the liquid to be distilled, instead of employing an inactive overlying liquid as herein described.

My present invention is particularly desirable for the treatment of carbon bisulfide for use in the manufacture of xanthates and particularly for the manufacture of viscose, it being well recognized that in the manufacture of viscose the purity of the carbon bisulfide is a matter of great importance. My invention is widely applicable, however, to the distillation of a great variety of volatile liquids, and may be applied with particular success to the distillation of both organic and inorganic bodies that are extremely sensitive to vaporous catalysts at the temperature of normal distillation. As it is today becoming well recognized that the action of catalysis is not confined to the relatively few striking examples earlier known, but instead is a phenomenon of rather general nature which enters into a large number of chemical changes where its presence was formerly wholly unsuspected, it will be readily seen that my invention, by offering a simple and convenient means of distilling liquids that are highly sensitive to catalytic activity while in vaporous condition, and particularly to the catalytic activity of other vapors, under the condition of intimate contact thus permitted, represents a distinct advance in the art of distilling volatile liquids. As many changes may be made without departing from the essential features of the invention as herein disclosed, no limitations of my invention should be imposed except such as are indicated by the appended claims.

I claim:

1. The process of purifying liquids which comprises distilling a volatile liquid while covered by an immiscible liquid of higher boiling point and lower specific gravity filling substantially all of the upper part of the still.

2. The process of distillation which comprises both vaporizing a liquid and condensing the vapor so produced within a body of an immiscible liquid of higher boiling point and lower specific gravity filling substantially all of the upper part of the still.

3. The process of distillation which comprises heating a liquid completely covered by an immiscible liquid of lower specific gravity and higher boiling point until vapor is produced and condensing such vapor within such body of immiscible liquid, such liquid filling substantially all of the upper portion of the still.

4. As a step in the purification of a liquid, the process which comprises vaporizing such liquid at a surface of contact with an immiscible liquid of higher boiling point and lower specific gravity filling substantially all of the upper part of the still.

5. The process of distillation which comprises vaporizing a volatile liquid at a surface of contact with an immiscible liquid of lower specific gravity and higher boiling point filling substantially all of the upper part of the still, and condensing the vapor so produced, within the body of immiscible liquid.

In testimony whereof, I have hereunto subscribed my name this 18th day of September, 1928.

WALTER O. SNELLING.